Aug. 28, 1923.
W. A. PETERS, JR
DISTILLATION APPARATUS
Filed July 17, 1920
1,466,411
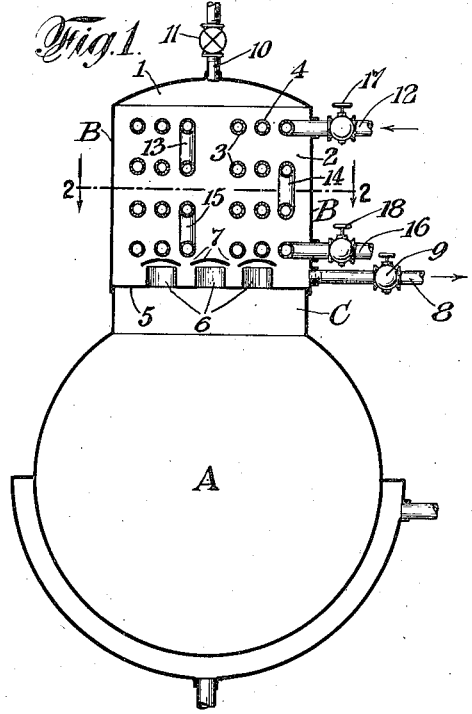
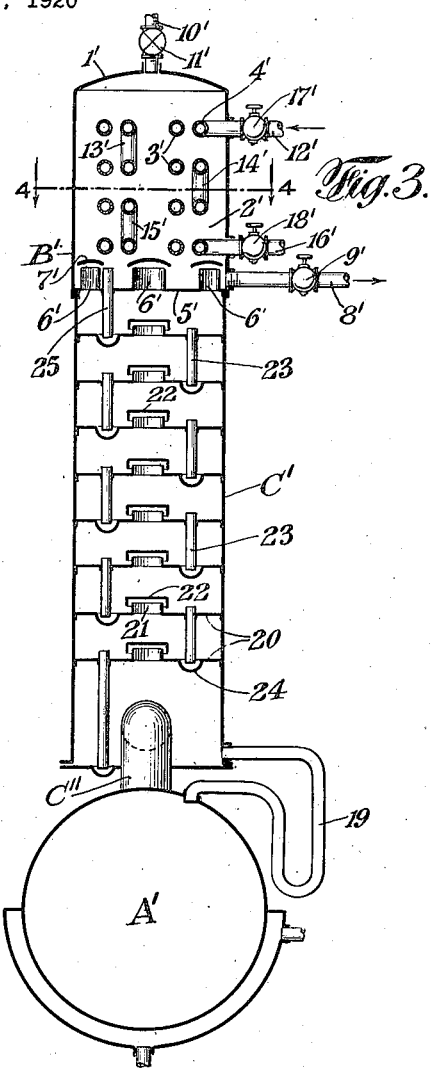
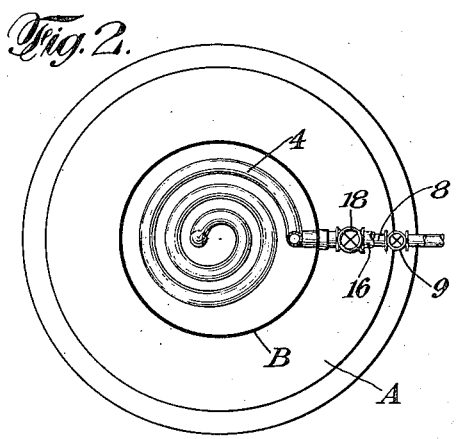
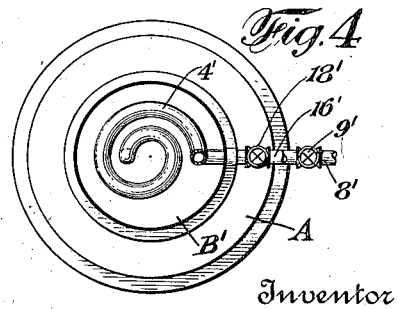
Inventor
W. A. Peters, Jr.,
By his Attorney
F. R. Squair Patented Aug. 28, 1923.

1,466,411

UNITED STATES PATENT OFFICE.

WILLIAM A. PETERS, JR., OF WILMINGTON, DELAWARE, ASSIGNOR TO E. I. DU PONT DE NEMOURS & COMPANY, OF WILMINGTON, DELAWARE, A CORPORATION OF DELAWARE.

DISTILLATION APPARATUS.

Application filed July 17, 1920. Serial No. 396,937.

*To all whom it may concern:*

Be it known that I, WILLIAM A. PETERS, Jr., a citizen of the United States, and a resident of Wilmington, in the county of New Castle and State of Delaware, have invented a certain new and useful Distillation Apparatus, of which the following is a specification.

This invention relates to distillation apparatus. More particularly it relates to a condenser of such character that the distilling vapors of liquids of high freezing points can be condensed to a liquid, without danger of freezing, with the use of merely simple water cooling for the condenser, the cooling of the condenser by the use of hot oil, or other inconvenient and difficultly controllable medium, being uncalled for and eliminated. Also, the invention relates to a distillation assembly having such a condenser incorporated therein.

It is frequently necessary or desirable to refine liquids with high freezing points by distillation, either with or without a fractionating column. If the freezing point of the substance to be refined is above 100° C. it is extremely difficult, with the ordinary type of water cooled condenser, to condense the substance to liquid form and at the same time avoid freezing. Unless the condenser is of just the proper size and the flow of cooling water is carefully regulated, the walls of the condenser become covered with solidified material and the whole condenser may become stopped up, thereby causing a dangerous vapor pressure in the still. In some cases this difficulty may be overcome by using hot oil as a cooling agent, but the use of oil requires a bulky and expensive apparatus, and in the cases of those materials, such as camphor which boils at 205° C. and freezes at 176° C., which boil at a temperature only slightly above their freezing points, the use of oil cooled condensers is not always practicable and it then becomes advisable to recover the vapors by cooling in a current of air or other gas in a so-called subliming chamber.

I have devised a condenser wherewith, although but simple water cooling be used therefor, substances with freezing points even above 350° C. and with boiling points only a few degrees higher than their freezing points, can be safely and easily condensed to liquid form without danger of freezing.

One object of the invention is to provide a condenser wherewith, with the use of but an unheated fluid, as cold water, as a cooling medium, substances of high boiling points, and freezing points close to their boiling points, can be condensed from vapor to liquid form without danger of freezing.

Another object is to provide a condenser having provisions for the condensing of the distilling vapors in the immediate presence of the as yet uncondensed vapors, for the flow of the condensed distillate counter to the flow of the distilling vapors, and for the exposure of such distillate to the vapors during the counterflow.

Another object is to provide a distillation assembly having a condenser of the character indicated incorporated therein, in advantageous combination with the other elements thereof.

Another object is to provide a combined fractionating column and condenser, the condenser having the characteristics above mentioned.

To these ends, and also to improve generally upon devices of the character indicated, my invention consists in the various matters hereinafter described and claimed.

Without restricting my invention thereto, I describe it by reference to the embodiments illustrated in the accompanying drawings. These drawings are somewhat conventional and diagrammatic in character and in them:—

Figure 1 is a vertical section of an apparatus embodying a still and condenser;

Figure 2 is a section substantially on the line 2—2 of Figure 1, looking in the direction of the arrows, and Figure 3 is a vertical section of an apparatus embodying a still, bubbler plate fractionating column, and condenser.

Referring more particularly to Figures 1 and 2:—The illustrated apparatus comprises a still A and condenser B so arranged, by the short direct vertical passage member C serving as a means for connecting the still and the condenser and also conveniently serving as a means for supporting the condenser on the still, that the distilling vapors pass to the condenser without material cooling.

The condenser B comprises a dome 1, presenting a condensing chamber 2, and has in said chamber the vertically arranged levels 3 of horizontal cooling coils 4. These coils lie directly across the path of the vapors rising from the still into the dome, thereby to be exposed thereto. The bottom 5 of the dome is joined fluid-tight with the dome's sides to form a species of trough or shelf for liquid, giving the bottom the character of a condensate-collecting device. It is provided with upstanding orifice pipes 6 for the passage of vapors from the passage member C to the chamber 2, the open ends of the pipes being preferably shielded by "umbrella" caps 7. A pipe 8, provided with a suitable control valve 9, and entering the dome below the level of the tops of the pipes 6, provides for the withdrawal of liquid from the condensate-collecting device, or bottom, 5. The pipe 8 may if desired be suitably heated to insure that the liquid will not freeze in its passage therethrough to the point where it is to be cast into blocks or otherwise disposed of. The pipe 10, desirably having a suitable control valve 11, serves for the drawing off of any uncondensable gases. The inlet pipe 12, the connecting pipes 13, 14, 15, from coil-level to coil-level, and the outlet pipe 16, provide for the circulation of cooling medium, e. g. water, from the pipe 12 through upper coil, to the next coil below, through that, and so on, and finally out at the pipe 16. Suitable control valves 17 and 18 are preferably provided for the pipes 12 and 16. The circulating medium may be supplied under any desired pressure and from any suitable source (not shown).

With this arrangement the rising vapors are condensed in the chamber, and the liquid collecting on the bottom 5 may be withdrawn. Supposing any of the liquid to freeze as it condenses on the pipes, the newly arriving vapors will not freeze in turn but will condense but to a liquid and at the same time tend to melt the solidified mass. The mass forms a non-conductor between the cold pipes and the newly-arriving vapors, so that the vapors are not frozen but are merely cooled sufficiently to condense them to liquid form, while their latent heat at the same time tends to melt the mass on the pipes. Thus no material amount of solid distillate collects on the pipes. It will be seen too, that the condenser has its coils, the bottom 5, and the draw-off pipe 8, so arranged that the descending condensate travels in, and counter to, the just-arriving vapors hot from the still and thus the descending liquid is kept from freezing.

So, with the present condenser the condensing proceeds without interruption, the arriving vapors preventing, for practical purposes, the freezing of liquid on the pipes and also preventing the solidifying of the liquid as it travels down the condenser and rests on the bottom ready to be drawn off in liquid form through the pipe 8. As a result I am able to dispense with the use of heated oil or the like, since it is not necessary to maintain a constant high temperature in the condenser, and instead of heated oil I can use just unheated water. It has been found that, no matter how cold the water inside the coils may be, the condensing vapor will not solidify to any extent, except perhaps somewhat, but not to an objectionable or harmful extent, at the upper portion of the condenser, in cases where there is an excess of cooling area.

As previously indicated, the still, and condenser, are so related by the means for connecting them, illustrated as the passage member C, and the condenser is so positioned, e. g. vertically with its coils horizontal, that the vapors are introduced at the bottom of the condenser and travel vertically upward therein, and the condensed distillate travels down through the upwardly traveling vapors. Desirably the condenser is arranged in vertical alignment with the still, as illustrated in the drawings. In Figures 1 and 2 the condenser is directly connected with the still, but in the apparatus illustrated in Figure 3 the connection between the still and condenser is indirect, thereby providing for the interposing of a fractionating column between the still and condenser.

In Figure 3, the column C', shown as of the bubbler plate type, is connected with the still A' by the riser pipe C'' and the reflux pipe 19, and has the condenser B' directly connected to the top thereof. It will be seen that the column C' and pipe C'' serve, as the pipe C of the embodiment illustrated in Figures 1 and 2 serves, as a passage member between the still and condenser. The condenser B' is, as illustrated, substantially like the condenser B and comprises the dome 1' presenting the condensing chamber 2' and has the levels 3' of coils 4', bottom 5' with orifice pipes 6' having umbrella caps 7', pipe 8' with its valve 9', pipe 10' with the valve 11', inlet pipe 12' connecting pipes 13', 14', 15', outlet pipe 16', and the valves 17' and 18'. The column C' is of the usual and standard type having plates 20, bubbler pipes 21 with deflecting caps 22 having down-turned edges, and drip pipes 23, each projecting above the plates to a height less than that of the pipes 21 above the plates but greater than the distance of the down-turned edges of the caps 22 above the plates, and each liquid-sealed to the plates by the depressions 24.

A reflux pipe 25 is provided for connecting the bottom of the condenser with the top of the column. With this arrangement, of the pipe 8' valved at 9' and the pipe 25, the amount of liquid returned to the column can be conveniently and accurately regulated, as the setting of the valve 9' fixes the amount drawn off, the excess returning to the column.

In purifying any material by fractionation it is necessary to return a certain definite proportion of the distillate to the top of the column by reflux. In some types of rectifiers this is done by condensing part of the distillate in one condensing unit called a dephlegmator and returning all of the distillate condensed therein to the top of the column. The remainder is condensed in a second condensing unit and withdrawn to receivers. In such a type of apparatus it may at times be difficult to properly control the ratio between the amount of liquid run back to the column and that withdrawn, when the material has such a high boiling point as camphor for instance, especially as the proportion of distillate run back to that withdrawn may be in the ratio of 5—1 or more. Small fluctuations in the total amount of vapor furnished from the still or in the amount or temperature of cooling fluid furnished to the first condenser will cause very great fluctuations in this ratio. In the present arrangement all the material condensed is received on the bottom of the condenser from which the required proportion is run back to the column. With it the effect of variation in the cooling liquid is of no importance. The effect of variations in the amount of vapor furnished from the still is of relatively small importance in changing the ratio of the liquid returned by reflux.

I claim:

1. In a distillation apparatus for the distillation, and condensation to liquid phase without freezing, of substances having relatively high freezing points, and providing for the use of a cooling medium at relatively low temperature; in combination, a still, an upright condenser having a condensate collector arranged at its lower portion, and means located vertically above said collector for the circulation of said cooling medium, whereby condensate can fall to said collector from the cooled portion of said condenser, means connecting and relatively closely associating said still and condenser and arranged for the introduction of vapors from said still adjacent and in heating relation to said collector and in position to pass upward in the condenser, whereby the hot vapors from said still can heat and maintain in liquid phase the condensate at said collector, that falling from the cooled portion of said condenser, and that collecting in such portion, and means for withdrawing from the collector the liquid condensate upon said collector.

2. In a distillation apparatus for the distillation, and condensation to liquid phase without freezing, of substances having relatively high freezing points, and providing for the use of cooling medium at relatively low temperature; in combination, a still, an upright condenser comprising a shell presenting a condensing chamber having a bottom in the character of a condensate collector and also comprising a pipe for the circulation of said cooling medium arranged crosswise of said chamber to lie in the direct path of vapors ascending from the bottom thereof, and also arranged above the bottom of said chamber whereby condensate can fall from said pipe to said bottom, means connecting and relatively closely associating said still and condenser and arranged for the introduction of vapors from said still adjacent and in heating relation to said bottom and in position to pass upward in the condenser, whereby the heated vapors from said still can heat and maintain in liquid phase, the condensate on said bottom, that falling from said pipe, and that collecting on said pipe, and means for withdrawing from said bottom the liquid condensate thereupon.

3. In a distillation apparatus for the distillation, and condensation to liquid phase without freezing, of substances having relatively high freezing points, and providing for the use of cooling medium at relatively low temperature; in combination, a still, an upright condenser comprising a shell presenting a condensing chamber having a bottom in the character of a condensate collector and also comprising a pipe for the circulation of said cooling medium arranged crosswise of said chamber to lie in the direct path of vapors ascending from the bottom thereof, and also arranged above the bottom of said chamber whereby condensate can fall from said pipe to said bottom, means including a fractionating column connecting and relatively closely associating said still and condenser and arranged for the introduction of vapors from said still adjacent and in heating relation to said bottom and in position to pass upward in the condenser, whereby the heated vapors from said still can heat and maintain in liquid phase, the condensate on said bottom, that falling from said pipe, and that collecting on said pipe, and means for withdrawing from said bottom the liquid condensate thereupon.

In testimony whereof I affix my signature.

WILLIAM A. PETERS, Jr.